United States Patent [19]

Armstrong

[11] Patent Number: 4,729,648
[45] Date of Patent: Mar. 8, 1988

[54] PARTIAL EYESHIELD

[76] Inventor: Jeffrey A. Armstrong, 9644 Observation Dr., Kirkland, Wash. 98033

[21] Appl. No.: 928,929

[22] Filed: Nov. 10, 1986

[51] Int. Cl.$^4$ .................. G02B 23/00; G03B 11/00; G03B 13/00
[52] U.S. Cl. .................................. 350/578; 350/319; 350/145; 358/229; 354/219
[58] Field of Search ............... 350/578, 145, 319, 537; 354/219, 224, 225; 358/229, 224

[56] References Cited

U.S. PATENT DOCUMENTS

| | | |
|---|---|---|
| 683,012 | 9/1901 | Hill . |
| 1,427,592 | 8/1922 | Hales . |
| 1,463,938 | 8/1923 | Carter . |
| 2,100,940 | 11/1937 | Coleman . |
| 2,800,052 | 7/1957 | Bechtold et al. . |
| 3,064,528 | 11/1962 | Gelatt .................................. 350/578 |
| 4,521,074 | 6/1985 | Kalaugher .......................... 350/145 |

FOREIGN PATENT DOCUMENTS

| | | | |
|---|---|---|---|
| 2240332 | 2/1974 | Fed. Rep. of Germany ...... | 354/219 |
| 15006 | of 1900 | United Kingdom ................ | 350/578 |
| 842456 | 7/1960 | United Kingdom ................ | 350/578 |

OTHER PUBLICATIONS

R. A. Crone, Normal Binocular Vision, Diplopia, pp. 107–108, 1973.
H. Davson, D. Sc., The Physiology of the Eye, pp. 470–475, 1972.
Y. Le grand, Binocular Vision, Form and Space Vision, pp. 193–201, 1967.
R. E. Records, M.D., Physiology of the Human Eye and Visual System, pp. 658–661, 1979.

Primary Examiner—Jon W. Henry
Attorney, Agent, or Firm—Christensen, O'Connor, Johnson & Kindness

[57] ABSTRACT

A partial eyeshield is attached to a sighting device, for example a video camera. The eyeshield is constructed so that it covers a portion of the field of view of the user's nonsighting eye. That portion of the nonsighting eye's field of view corresponds to a portion of the field of view of the sighting eye the user desires to view without closing his nonsighting eye. So covering the nonsighting eye causes the corresponding field of view in the sighting eye to dominate, while leaving substantial usable vision through the nonsighting eye.

19 Claims, 6 Drawing Figures

PARTIAL EYESHIELD

FIELD OF THE INVENTION

This invention relates to eyeshields and, more particularly, to eyeshields that are used for shielding one eye while the other eye is sighting or looking through a device that is being aimed.

DESCRIPTION OF THE PRIOR ART

It is often desirable, and, in some situations, necessary, to use a sighting device to assist the eye. Some sighting devices, such as viewfinders for cameras, are attached to or incorporated in other devices that are aimed; other, such as many types of microscopes and small telscopes, are themselves devices that are aimed. The term "sighting device," as used herein, includes both types of sighting devices and encompasses any devices which the first type may be attached to or incorporated in.

Sighting devices used by only one eye at a given moment are referred to herein as single eye sighting devices. Such sighting devices, by occupying at least a portion of the binocular region of the user's binocular field of view, may cause the user to experience binocular rivalry. The binocular field of view is the entire area visible to both eyes at a given moment. Its binocular region is the region in its center common to the fields of view of both eyes. For each and every portion of one eye's field of view lying in this region, there is a corresponding portion of the other eye's field of view that lies in the same part of this region. Binocular rivalry is the temporal alternation in what the observer sees between the image in the right eye's field of view and the image in the left eye's field of view that results when the two images are in corresponding portions of the two eyes' fields of view and are sufficiently different in brightness, color, and contour not to fuse into a single perceived image as they normally would. At a given moment, the image in the field of view of one eye predominates while the other is suppressed, then suddenly the suppressed image emerges into perception and dominates the image that was predominant. This phenomenon of alternating dominant images discomforts the single eye sighting device user and inhibits him in his use of the device. Thus, it is virtually impossible to perceive the desired image through the sighting device.

One way single eye sighting device users have attacked the problem of binocular rivalry is by contracting the facial muscles surrounding the eye not using the sighting device in order to close that eye. However, this method leads to muscle fatigue and the discomfort associated with that condition, especially during long periods of continuous sighting. Another way single eye sighting device users have attacked the problem is by using devices for occupying the nonsighting eye's entire field of view and eliminating the image which is in it, which devices are hereinafter referred to as "eyeshields." While the method of using eyeshields solves the problem of muscle fatigue associated with closing one eye, it is not entirely satisfactory because it relies on elimination of the entire image in the nonsighting eye's field of view for stopping binocular rivalry and, hence, often results in the elimination of vision which is of use to the single eye sighting device user, referred to herein as usable vision. Usable vision may be medial vision or peripheral vision. Medial vision is vision in the eye's medial field of view, that portion of the eye's field of view that lies in the binocular region of the binocular field of view. Peripheral vision is vision in the eye's peripheral field of view, that portion of the eye's field of view which lies outside the medial portion. The single eye sighting device user often relies upon peripheral or medial vision in the nonsighting eye for locating objects at which he wishes to aim and for keeping his body out of harm's way, for example, walking up or down stairs, or even walking on the level with obstacles in the user's path. The total elimination of this vision that accompanies the elimination of binocular rivalry by closing one eye or eyeshield use significantly reduces his ability to effectively use the device, especially in situations where the device must be used continuously for relatively long stretches of time.

SUMMARY OF THE INVENTION

A partial eyeshield and a method of using a partial eyeshield with a single eye sighting device are provided. The partial eyeshield occupies only a portion of the field of view of the nonsighting eye sufficient to (1) cause the image in the sighting eye's field of view transmitted through the single eye sighting device's sighting aperture to dominate and suppress the image that lies in the corresponding portion of the nonsighting eye's field of view and (2) maintain usable vision in the nonsighting eye. Thus, the partial eyeshield and method of using a partial eyeshield with a single eye sighting device solve the problems of fatigue and total loss of usable vision in the nonsighting eye associated with closing one eye and complete eyeshield use. As a result, the user of the partial eyeshield can comfortably view the desired image through the eyepiece while retaining substantial usable eyesight through the nonsighting eye.

DESCRIPTION OF THE PREFERRED EMBODIMENTS

Figure 1:
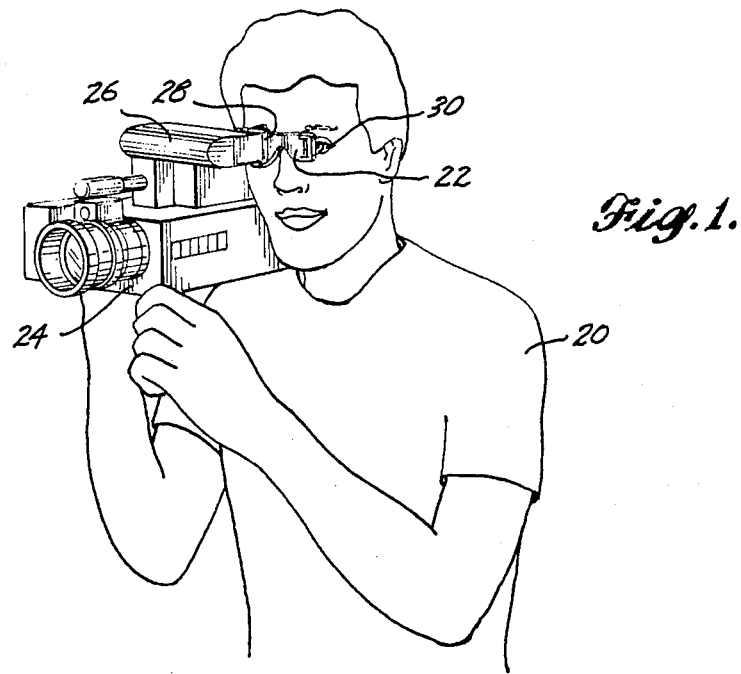
FIG. 1 is a perspective view of a person using, with a video camera, a partial eyeshield constructed in accordance with the present invention.

Referring now to FIG. 1, a video camera user 20 is using a partial eyeshield 22 of the present invention in conjunction with a video camera 24. The user 20 is supporting the video camera 24 on his shoulder so that its viewfinder 26 occupies the field of view of the sighting eye 28, in this case the right eye, and so that the partial eyeshield 22, which is attached to the viewfinder 26, occupies only a portion of the field of view of the nonsighting eye 30, in this case the left eye.

Figure 2:
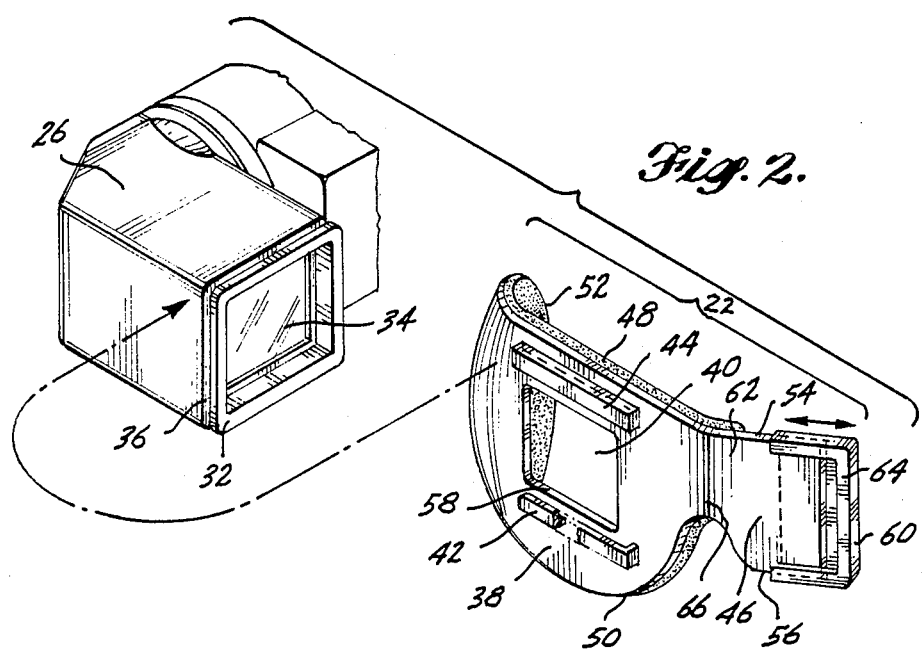
FIG. 2 is an exploded and enlarged isometric view of the video camera viewfinder and partial eyeshield of FIG. 1, with the viewfinder rotated 90° away from the partial eyeshield.

Referring to FIG. 2, the partial eyeshield 22 of FIG. 1 and the end of the viewfinder 26 of FIG. 1 to which it attaches are illustrated. The partial eyeshield 22 has been detached and rotated 90° away from the viewfinder 26. The rectangular posterior face 32 of the viewfinder 26, which faces the sighting eye of the video camera user of FIG. 1, contains a rectangular sighting aperture 34 through which the field of view of the video camera is transmitted to the video camera user's sighting eye. A rectangular flange 36 extends around the periphery of the sighting aperture 34 approximately one-eighth inch from the surface of the viewfinder's posterior face 32. This flange 36 conventionally carries an eyecup, which is normally in place to prevent stray light from reaching the viewfinder's posterior face 32.

The partial eyeshield 22 includes an opaque supporting plate 38, which has a rectangular aperture 40 dimensioned to match the viewfinder sighting aperture 34, and two parallel and horizontal mounting bars 42, 44 affixed to the supporting plate 38 on opposite upper and lower sides of the plate aperture 40. The mounting bars 42, 44 have an "L" shaped cross section and are configured to receive the upper and lower portions of the flange 36 to mount the partial eyeshield 22 on the viewfinder 26. Thus the parallel bars 42, 44 adapt the partial eyeshield 22 for sliding onto and off of the viewfinder flange 36 and for positioning the plate aperture 40 coincidently over the sighting aperture 34. The partial eyeshield 22 also includes an adjustable plastic two-piece opaque shielding arm 46. The supporting plate 38 is constructed and sized so that when the partial eyeshield 22 is in use it occupies the field of view of the sighting eye outside of the viewfinder sighting aperture 34 by extending from the plate aperture 40 upward to a horizontal top edge 48 in the line of the user's eyebrow, downward to bottom edge 50 curved along the user's cheekbone, laterally and posteriorly around the eye to a curved edge 52 at the user's temple, and medially to the bride of the nose. The shielding arm 46 is constructed and sized so that when the partial eyeshield 22 is in use it extends from the supporting plate 38 at the bridge of the nose laterally in front of the nonsighting eye, with a horizontal top edge 54 in the line of the top edge 48 of the supporting plate 38, a horizontal bottom edge 56 in the line of the bottom 58 of the plate aperture 40, and a vertical lateral edge 60 just laterally outside of the portion of the nonsighting eye's field of view that corresponds to the portion of the sighting eye's field of view transmitted through the sighting aperture 34. The shielding arm 46 is composed of two pieces, a medial piece 62, which integrally extends from the supporting plate 38, and a lateral piece 64, which has top, bottom and lateral edges which respectively wrap around the top, bottom and lateral edges of the medial piece 62 so that the lateral piece 64 slides horizontally on the medial piece 62, allowing adjustment of the lateral reach of the shielding arm 46 to accommodate sighting apertures of different sizes and different interocular distances. The shielding arm's medial pieee 62 and the supporting plate 38 are at their junction 66 notched from below to allow the partial eyeshield 22 to fit over the nose.

Figure 3:
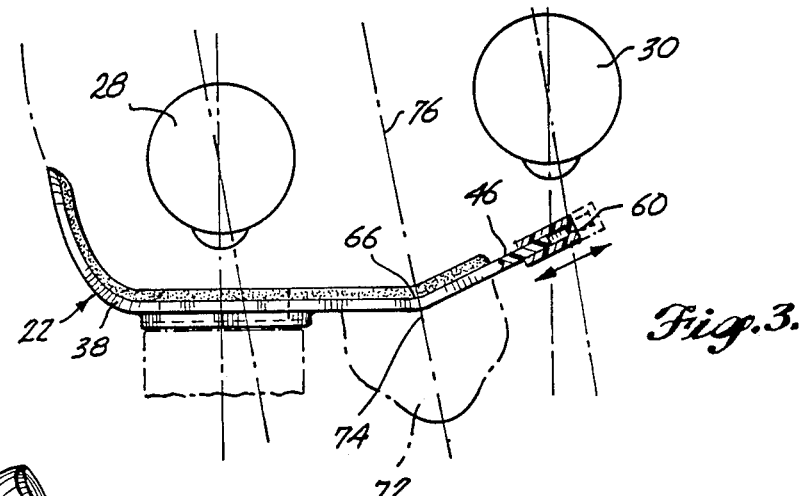
FIG. 3 is a plan view of the partial eyeshield of FIGS. 1 and 2, showing the positioning of the eyeshield relative to the user's eye and nose.

FIG. 3 illustrates the partial eyeshield 22 of FIGS. 1 and 2 and the eyes 28, 30 and nose 72 of the video camera user of FIG. 1, as seen from above. The partial eyeshield 22 is positioned over the bridge 74 of the nose 72 and in front of the eyes 28, 30 as it would be positioned in use. The supporting plate 38 and shielding arm 46 of the partial eyeshield 22 join at the bridge 74 of the nose 72, forming a posterior angle of approximately 155° with respect to each other which is bisected by the plane of symmetry 76 of the head. From this junction 66, the supporting plate 38 extends laterally and posteriorly in front of and past the right, sighting eye 28, while the shielding arm 46 extends laterally in front of but not past the left, nonsighting eye 30, so that its lateral edge 60 is just laterally outside of the portion of the nonsighting eye's field of view that corresponds to the portion of the sighting eye's field of view transmitted through the sighting aperture.

Figure 4:
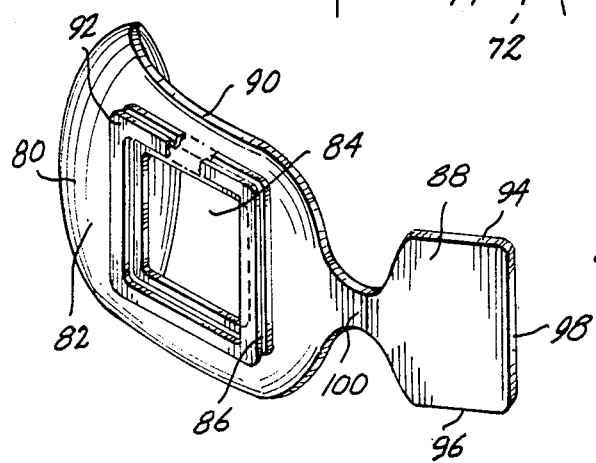
FIG. 4 is an isometric view of a reversible partial eyeshield of the present invention.

From the foregoing description of a partial eyeshield of the present invention configured for sighting with the right eye, it should be readily appreciated that a partial eyeshield with similar features can be configured for sighting with the left eye. A partial eyeshield can also be configured for sighting with either the right eye or the left eye. Such a reversible partial eyeshield 80 is illustrated in FIG. 4. Like the partial eyeshield of FIG. 2, the reversible partial eyeshield 80 of FIG. 4 is designed to be used with the video camera of FIG. 1. It includes an opaque rubber supporting cup 82 having a rectangular aperture 84 dimensioned to match the viewfinder sighting aperture, an accordion-like bellow 86 for attaching the supporting cup 82 to the flange of the viewfinder of FIG. 2, and an opaque rubber shielding arm 88 which can be adhesively affixed to the supporting cup 82 or can be formed integrally therewith. The supporting cup 82 is constructed and sized so that when it is in use it occupies the field of view of the sighting eye outside of the viewfinder sighting aperture by extending from the cup aperture 84 concavely with respect to the sighting eye to a rim 90 that flexibly contacts, or almost contacts, the user's face around the eye at the lower forehead, cheek, temple, and bridge of the nose. The accordion-like bellow 86 extend in two pleats integrally, anteriorly, and rectangularly from the rectangular interior edge that forms the cup aperture 84 of the supporting cup 82, with the last pleat 92 constructed and sized to flexibly fit over and grip the viewfinder flange. The shielding arm 88 is constructed and sized so that when the partial eyeshield 80 is in use, it extends integrally from the supporting cup 82 at the bridge of the nose laterally in front of the nonsighting eye, with a horizontal top edge 94 in the line of the user's eyebrow, a horizontal bottom edge 96 in the line of the bottom of the cup aperture 84, and a vertical lateral edge 98 just laterally outside of the portion of the nonsighting eye's field of view that corresponds to the portion of the sighting eye's field of view transmitted through the sighting aperture. The shielding arm 88 and supporting cup 82 are at their junction 100 notched from below, to allow the partial eyeshield 80 to fit over the nose, and opposingly notched from above to allow the partial eyeshield 80 to fit over the nose when it is flipped upside down for the purpose of sighting with the other eye.

Figure 5:
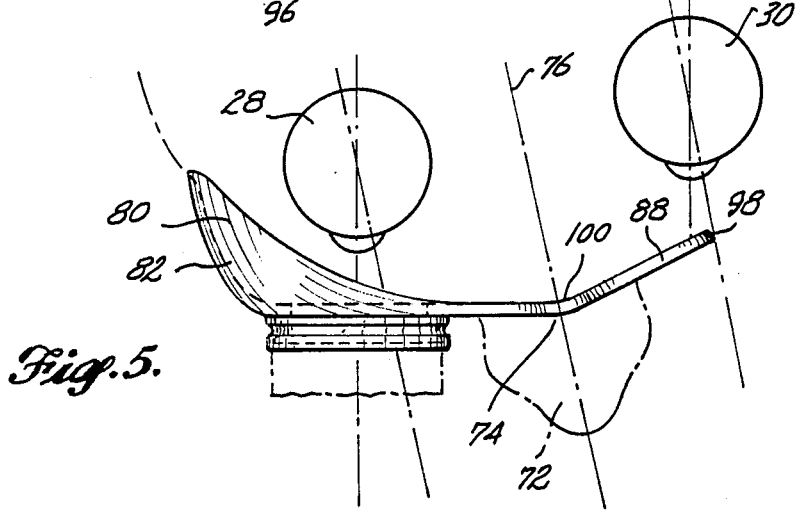
FIG. 5 is a plan view of the partial eyeshield of FIG. 4, showing the positioning of the eyeshield relative to the user's eyes and nose.

FIG. 5 illustrates the partial eyeshield 80 of FIG. 4 and the eyes 28, 30 and nose 72 of the video camera user of FIG. 1, as seen from above. The partial eyeshield 80 is positioned over the nose 72 and in front of the eyes 28, 30 as it would be positioned in use. The supporting cup 82 and shielding arm 88 of the partial eyeshield 80 join at the bridge 74 of the nose 72, forming a posterior angle of approximately 155° with respect to each other which is bisected by the plane of symmetry 76 of the head. From this junction 100, the supporting cup 82 extends laterally and posteriorly in front of and past the right, sighting eye 28, while the shielding arm 88 extends laterally in front of but not past the left, nonsighting eye 30, so that its lateral edge 98 is just laterally outside of the portion of the nonsighting eye's field of view transmitted through the sighting aperture.

Figure 6:
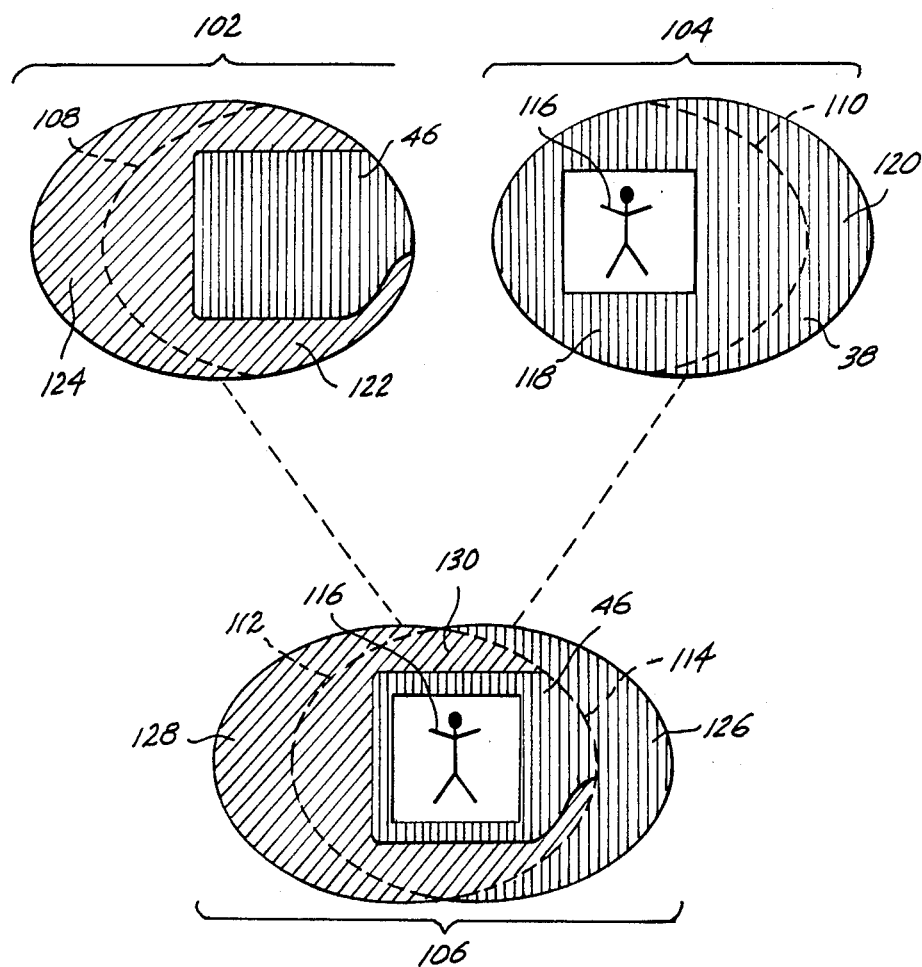
FIG. 6 is an elevational view showing the fields of view of each eye, together with their binocular field of view, when the partial eyeshield of FIGS. 2 and 3 is in use.

FIG. 6 shows the field of view of each eye 102, 104, together with the binocular field of view 106, when the partial eyeshield of FIG. 2 is in use. Portions of the fields of view that are occupied by the partial eyeshield 22 are illustrated with a pattern of closely spaced vertical lines. Portions of the fields of view that contain the image transmitted through the video camera viewfinder's sighting aperture are illustrated with a stick figure on a white rectangular background. Portions of the fields of view in which usable vision, other than vision through the sighting aperture, is maintained are illustrated with a pattern of diagonal lines. Heavy dashed lines 108, 110, 112, 114 mark the boundaries between the medial and peripheral fields of view of each eye and between the binocular and two peripheral regions of the binocular field of view 106. In the sighting eye's field of view 104, the image transmitted through the sighting aperture 116 lies entirely in the medial field of view 118, and the partial eyeshield's supporting plate 38 occupies the surrounding remainder of the medial field of view 118 and all of the peripheral field of view 120. In the nonsighting eye's field of view 102, the partial eyeshield's shielding arm 46 occupies only a portion of the medial field of view 122, and usable vision is maintained in the surrounding remainder of the medial field of view 122 and all of the peripheral field of view 124. In the binocular field of view 106, the right peripheral region 126 contains the image associated with the shielding plate that is in the right eye's peripheral field of view 120, the left peripheral region 128 contains the image associated with usable vision that lies in the left eye's peripheral field of view 124, and the binocular region 130 contains, continuously, both the image transmitted through the sighting aperture 116, bordered by the peripheral part of the image associated with the shielding arm 46, and the image associated with usable vision that lies in the left eye's medial field of view 122.

Thus, by causing the image transmitted through the sighting aperture 116 to be continuously contained in the binocular region 130 of the binocular field of view 106, the partial eyeshield has eliminated binocular rivalry. The opaque shielding arm 46 has sufficiently diminished the intensity and contour of the image in the portion of the nonsighting eye's field of view corresponding to the portion of the sighting eye's field of view containing the image transmitted through the sighting aperture 116 to cause the latter image to dominate and suppress the former. Additionally, by not occupying all of the nonsighting eye's field of view 102, the partial eyeshield has maintained substantial usable vision in that field of view.

The partial eyeshield will not assuredly eliminate binocular rivalry between the image in the portion of the sighting eye's field of view transmitted through the sighting aperture and the image in the corresponding portion of the nonsighting eye's field of view unless it occupies at least that corresponding portion of the nonsighting eye's field of view. If the partial eyeshield occupies more of the nonsighting eye's field of view than that corresponding portion, it will maintain less usable vision in the nonsighting eye's field of view. The portion of the nonsighting eye's field of view that is occupied will depend upon the partial eyeshield's distance from the nonsighting eye as well as its size.

What materials are chosen for the partial eyeshield's components will depend upon many factors, including ease of use in the fabrication process, cost, comfort to the user, and shielding capability. While components of opaque plastic and rubber have been used for the heretofore illustrated embodiments of the invention, it should be understood that other materials and combinations of these materials can be employed for these and other embodiments. In particular, it should be understood that the partial eyeshield need not be constructed of a solid, opaque material in order to function in accord with the invention. For example, in many cases a translucent shielding arm or other shielding member will sufficiently diminish the contours in the image in the portion of the nonsighting eye's field of view corresponding to the portion of the sighting eye's field of view containing the image transmitted through the single eye sighting device's sighting aperture to cause the latter image to dominate and suppress the former. Alternatively, in some cases, a filtering shielding member will sufficiently reject light radiation of certain frequencies emanating from the image in the portion of the nonsighting eye's field of view corresponding to the portion of the sighting eye's field of view containing the image transmitted through the sighting aperture to cause the latter image to dominate and suppress the former.

The partial eyeshield need not occupy the portion of the field of view of the sighting eye that is outside the viewfinder sighting aperture in order to eliminate binocular rivalry. When not occupied by the partial eyeshield, this portion of the sighting eye's field of view will ordinarily contain the same image contained in the corresponding portion of the nonsighting eye's field of view, so no binocular rivalry should occur. The supporting plate 38 of the partial eyeshield 22 of FIG. 2 and the supporting cup 82 of the partial eyeshield 80 of FIG. 4, both of which occupy the portion of the sighting eye's field of view that is outside the viewfinder sighting aperture, enhance sighting not essentially by contributing to the elimination of binocular rivalry but by intensifying the image transmitted through the sighting aperture relative to the image in the surrounding field of view of the sighting eye.

The construction and size of the single eye sighting device to which the partial eyeshield is to be attached may also affect the construction and size of the partial eyeshield. For example, for a sighting device lacking the convenient flange 36 of the video camera viewfinder 26 of FIG. 2, the partial eyeshield may have a supporting plate, cup, or other type of frame with two opposing legs that can be clipped around some portion of the sighting device. For a sighting device with a nonrectangular aperture, the partial eyeshield may have a supporting frame containing a matching nonrectangular aperture.

The type of environment in which the partial eyeshield will be used may also affect its size and construction. A retractability feature may be especially useful in a partial eyeshield that is incorporated in, rather than detachably affixed to, a single eye sighting device. In the embodiment of the partial eyeshield 22 illustrated in FIG. 2, this type of feature could be included by vertically hinging the supporting plate 38 so that the more lateral portion of the partial eyeshield 22 can be folded back against the viewfinder 26.

While the present invention has been described in conjunction with preferred embodiments, one of ordinary skill after reading the foregoing specification will be able to effect various changes, substitutions of equivalents, and other alterations to the articles of manufacture set forth herein. It is therefore intended that the protection granted by Letters Patent hereon be limited only by the definition contained in the appended claims and equivalents thereof.

The embodiments of the invention in which an exclusive property or privilege is claimed are defined as follows:

1. In combination with a camera used by a person, said person having a sighting eye and a nonsighting eye, an improvement comprising:
   (a) a partial shielding means for occupying a portion of the nonsighting eye's field of view sufficient to:
      (i) cause the image in the portion of the sighting eye's field of view transmitted through the camera's sighting aperture to dominate and suppress the image in the corresponding portion of the nonsighting eye's field of view, and
      (ii) maintain unobstructed, usable vision in at least a portion of the nonsighting eye's medial field of view; and
   (b) a supporting means for supporting the partial shielding means before the nonsighting eye.

2. The improvement of claim 1, wherein the usable vision maintained in the nonsighting eye's field of view includes at least a portion of the nonsighting eye's peripheral vision.

3. The improvement of claim 1, wherein the partial shielding means comprises a shielding member dimensioned to occupy that portion of the nonsighting eye's field of view that substantially corresponds to the portion of the sighting eye's field of view that contains only the image transmitted through the camera's sighting aperture when the shielding member is positioned before the nonsighting eye.

4. The improvement of claim 3, wherein the shielding member is divided into a first shielding submember which is affixed to the supporting means and a second shielding submember which is slidably carried by the first shielding submember.

5. The improvement of claim 1, wherein the supporting means comprises a supporting frame affixed to the partial shielding means and affixed to the camera.

6. The improvement of claim 5, wherein the supporting frame is detachably affixed to the camera.

7. The improvement of claim 5, wherein the supporting frame is dimensioned so that it substantially occupies the field of view of the sighting eye outside of the camera's sighting aperture when the partial shielding means is supported before the nonsighting eye.

8. The improvement of claim 1, further comprising:
   a means associated with said partial shielding means for adjusting the position of the partial shielding means to vary the portion of the nonsighting eye's field of view that is occupied by the partial shielding means.

9. A partial eyeshield, for use by a person in conjunction with a single eye sighting device, said person having a sighting eye and a nonsighting eye, comprising:
   (a) a partial shielding means for occupying a portion of the nonsighting eye's field of view sufficient to:
      (i) cause the image in the portion of the sighting eye's field of view transmitted through the single eye sighting device's sighting aperture to dominate and suppress the image in the corresponding portion of the nonsighting eye's field of view, and
      (ii) maintain unobstructed, usable vision in at least a portion of the nonsighting eye's medial field of view; and
   (b) a supporting means for supporting the partial shielding means before the nonsighting eye.

10. A partial eyeshield as claimed in claim 9, wherein the usable vision maintained in the nonsighting eye's field of view includes at least a portion of the nonsighting eye's peripheral vision.

11. A partial eyeshield as claimed in claim 9, wherein the partial shielding means comprises a shielding member dimensioned to occupy that portion of the nonsighting eye's field of view that substantially corresponds to the portion of the sighting eye's field of view that contains only the image transmitted through the single eye sighting device's sighting aperture when the shielding member is positioned before the nonsighting eye.

12. A partial eyeshield as claimed in claim 11, wherein the shielding member is divided into a first shielding submember which is affixed to the supporting means and a second shielding submember which is slidably carried by the first shielding submember.

13. A partial eyeshield as claimed in claim 9, wherein the supporting means comprises a supporting frame affixed to the partial shielding means and affixed to the sighting device.

14. A partial eyeshield as claimed in claim 13, wherein the supporting frame is detachably affixed to the sighting device.

15. A partial eyeshield as claimed in claim 13, wherein the supporting frame is dimensioned so that it substantially occupies the field of view of the sighting eye outside of the single eye sighting device's sighting aperture when the partial shielding means is supported before the nonsighting eye.

16. A partial eyeshield as claimed in claim 9, further comprising: a means associated with said partial shielding means for adjusting the position of the partial shielding means to vary the portion of the nonsighting eye's field of view that is occupied by the partial shielding means.

17. A partial eyeshield as claimed in claim 9, further comprising: a means associated with said supporting means for adjusting the position of the partial shielding means to vary the portion of the nonsighting eye's field of view that is occupied by the partial shielding means.

18. A method of using a single eye sighting device, for a person, said person having a sighting eye and a nonsighting eye, which method comprises the steps of:
   (a) positioning the single eye sighting device before the sighting eye; and
   (b) positioning before the nonsighting eye a partial shielding means for occupying a portion of the nonsighting eye's field of view sufficient to:
      (i) cause the image in the portion of the sighting eye's field of view transmitted through the single eye sighting device's sighting aperture to dominate and suppress the image in the corresponding portion of the nonsighting eye's field of view, and
      (ii) maintain unobstructed, usable vision in at least a portion of the nonsighting eye's medial field of view.

19. A method of using a single eye sighting device as claimed in claim 18, wherein the step of positioning the partial shielding means is carried out by positioning a shielding member before the nonsighting eye so that it occupies that portion of the nonsighting eye's field of view that substantially corresponds to that portion of the sighting eye's field of view that is occupied by the single eye sighting device's sighting aperture.

* * * * *

UNITED STATES PATENT AND TRADEMARK OFFICE
CERTIFICATE OF CORRECTION

PATENT NO. : 4,729,648

DATED : March 8, 1988

INVENTOR(S) : Jeffrey A. Armstrong

It is certified that error appears in the above-identified patent and that said Letters Patent is hereby corrected as shown below:

```
Title page, under "FOREIGN PATENT DOCUMENTS":
   "of   1900" should be --6/1900--
Column 1, line 17:  "telscopes" should be
   --telescopes--
Column 4, line 36:  "bellow" should be --bellows--
Column 5, line 35:  "usuable" should be --usable--
```

Signed and Sealed this

Eleventh Day of October, 1988

Attest:

DONALD J. QUIGG

Attesting Officer

Commissioner of Patents and Trademarks